United States Patent [19]

Moore et al.

[11] Patent Number: 4,798,438

[45] Date of Patent: Jan. 17, 1989

[54] METHOD OF MAKING A SINGLE-MODE EVANESCENT-WAVE COUPLER HAVING REDUCED WAVELENGTH DEPENDENCE

[75] Inventors: Douglas Moore, Buffalo Grove, Ill.; Mark E. Marcus, Scottsdale, Ariz.

[73] Assignee: Gould Inc., Rolling Meadows, Ill.

[21] Appl. No.: 918,966

[22] Filed: Oct. 15, 1986

[51] Int. Cl.$^4$ ............................................. G02B 6/42
[52] U.S. Cl. .............................. 350/96.15; 350/96.29
[58] Field of Search .......................... 350/96.15, 96.29

[56] References Cited

U.S. PATENT DOCUMENTS

| | | | |
|---|---|---|---|
| 4,315,666 | 2/1982 | Hicks, Jr. | 350/96.32 X |
| 4,342,499 | 8/1982 | Hicks, Jr. | 350/96.29 X |
| 4,632,513 | 12/1986 | Stowe et al. | 350/320 |

OTHER PUBLICATIONS

Payne et al., "Modeling Fused Single-Mode Fiber Couplers", Elec. Lett. vol. 21, No. 11, pp. 461-462 May 1985.
Georgiou et al., "Low-Loss Single-Mode Optical Couplers" IEEE Proc. vol. 132 Pt. J. Nat, pp. 297-302, Oct. 1985.
Wright, "Wavelength Dependence of Fused Couplers", Elect. Lett. vol. 22, No. 6, pp. 320-321 Mar. 1986.
Snyder, "Coupled-Mode Theory for Optical Fibers", Opt. Soc. Amer., 62 pp. 1267-1277 Nov. 1972.
Lamont et al., "Tuned-port Twin Biconical-Taper Fiber Splitters" Opt. Lett. vol. 10, No. 1 Jan. 1984.
Whalen et al., "Effectively Nonreciprocal Evanescent-Wave Opt. Fiber Directional Coupler," Elect. Lett. 21 #5 Feb. 1985.
Digonnet et al., "Wavelength Multiplexing in Single Mode Fiber Couplers", Appl. Opt. vol. 22 No. 3, pp. 484-491 Feb. 1983

Kopera et al., "Performance Evaluation of Single-Mode Couplers", Proc. SPIE 479 1984.
DeFornel et al., "Analysis of Single-Mode Fused Tapered Fiber Couplers", IEEE Proc. vol. 131 pt.H 221, Aug. 1984.
Bures et al., "Analysis of a Fused Bidirectional Single-Mode Fiber Coupler", Appl. Opt. vol. 22, Feb. 1983.
Kawasaki et al., "Low-Loss Access Coupler for Multimode Optical Fiber Distribution Network", Appl. Opt. vol. 16 No. 7, 1977.
Motimore, "Wavelength-Flattened Fused Couplers", Elec. Lett. vol. 21, No. 17, pp. 742-743 Aug. 1985.
Bergh et al., "Single-Mode Fiber Optic Directional Coupler", Elec. Lett. vol. 16 No. 7, Mar. 1980.
Beasley et al., "Evanescent Wave Optic Couplers : Three Methods" Proc. SPIE 417, 1983.
Kaloasaki et al., "Biconical-taper Single-Mode Fiber Coupler", Opt. Lett. vol. 6, No. 7, Jul. 1981.
Villarruel et al., "Fused Single Mode Fiber Access Coupler", Elec. Lett. vol. 17, Feb. 1981.

Primary Examiner—Gene Wan

[57] ABSTRACT

A method of making a single-mode evanescent-wave coupler having reduced wavelength dependence includes the steps of (a) providing first and second single-mode optical fibers having substantially identical propagation constants; (b) heating the first optical fiber along a first longitudinal segment thereof while stretching the first optical fiber to reduce the diameter of the first longitudinal segment, the reduced diameter being substantially uniform along the first longitudinal segment; (c) maintaining the first and second optical fibers in parallel juxtaposition with one another along a portion of the first longitudinal segment; and (d) fusing together the portions of the first and second optical fibers maintained in parallel juxtaposition to form a coupling region.

18 Claims, 4 Drawing Sheets

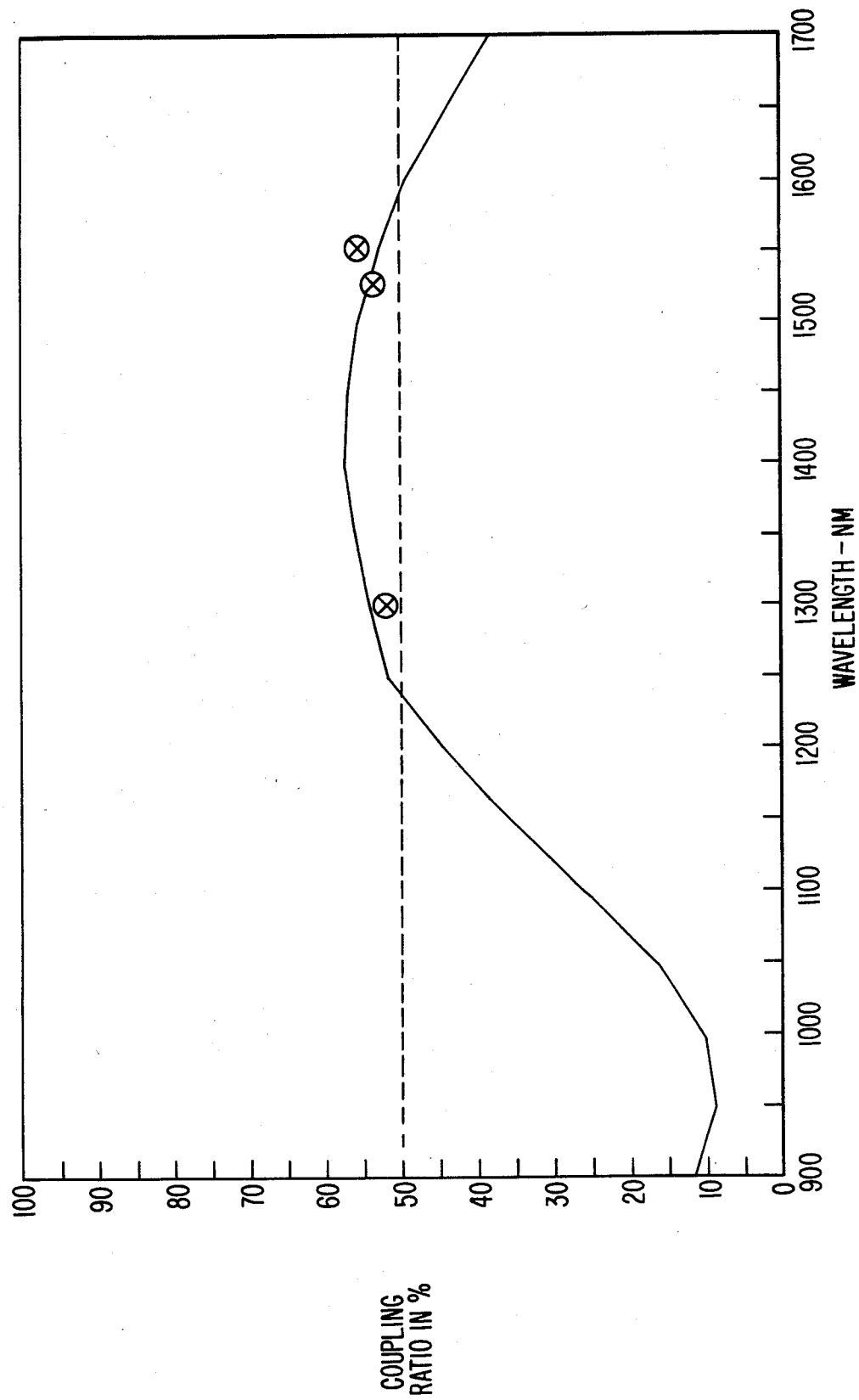

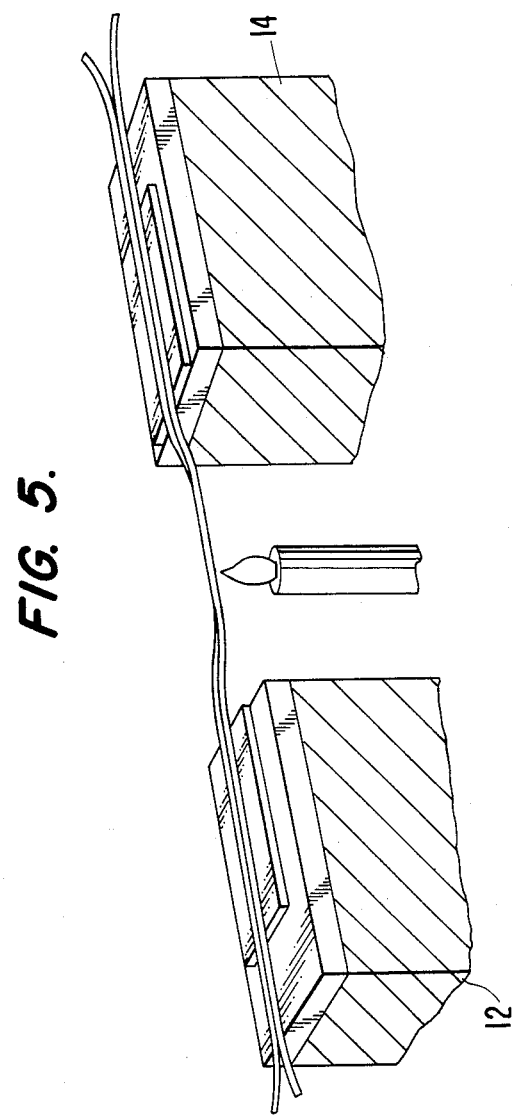

METHOD OF MAKING A SINGLE-MODE EVANESCENT-WAVE COUPLER HAVING REDUCED WAVELENGTH DEPENDENCE

BACKGROUND OF THE INVENTION

This invention relates to a method of making single-mode evanescent-wave couplers having reduced wavelength dependence.

A fiber optic coupler is a device that passively splits or combines light between two or more optical fibers. An evanescent-wave coupler is one in which optical energy is transferred from one optical fiber to another by virtue of the electric field overlap between the two cores of the fibers. Since the evanescent field of an optical fiber is an exponentially decaying field, the cores of the two fibers must be brought into close proximity. In general, evanescent-wave couplers are usually constructed using one of three methods; etch and twist, asymmetric polish and fused biconical taper. In the first two fabrication methods the cladding layers of the fibers are preferentially removed by chemical etching or mechanical polishing techniques. The fibers are then placed in contact with one another and carefully aligned to achieve optical coupling. The fused biconical taper (FBT) couplers are fabricated by heating two optical fibers until they coalesce into a composite waveguiding structure. While the fibers are being heated, they are slowly stretched and tapered. This causes the light in the fiber to spread out far enough into the composite structure where it can be coupled to the other fiber.

With the possible exception of some bulk optic coupler devices, all of the single mode couplers developed to date exhibit coupling ratios that vary substantially with the wavelength of light being used. As a result, the couplers must be fabricated for operation in a specific wavelength region (e.g. 820 nm, 1300 nm and 1550 nm) and are of very limited use in fiber optic systems that operate at more than one wavelength. The coupling ratio of a standard 3dB [50/50] FBT coupler can vary at a rate of 0.1%/nm to 0.3%/nm depending on the type of fiber, the fabrication process and the wavelength. Consequently, a 50% coupler made at 1300 nm will typically exhibit a coupling ratio ranging anywhere from 75% to 90% at 1550 nm. Moreover, a 50% coupling ratio at 1270 nm could increase to as much as 68% at 1330 nm. This behavior can be a serious limitation in many applications since the wavelength tolerance of most laser diode manufacturers is ±30 nm.

Recently, D. B. Mortimore described a technique for reducing the typical wavelength dependence of the optical coupling in single-mode FBT couplers (D.B. Mortimore, Wavelength-Flattened Fused Couplers, Electron. Lett. 21, 742 (1985)). Mortimore showed that the wavelength dependence of a single-mode coupler could be reduced by fabricating the coupler with fibers having different propagation constants. Mortimore suggests that the difference in propagation constant can be achieved by using fibers having different diameters or profile or by tapering one of two identical fibers more than the other.

Of the two methods suggested by Mortimore to introduce a mismatch in the propagation constants of the two fibers that comprise the coupler, the seemingly easiest method is to use two different fibers. This approach, however, is not preferred because all fibers are somewhat different and successful results with one particular pair of fibers do not guarantee similar results with another pair. The more attractive approach noted by Mortimore consists of starting with two identical fibers and changing the propagation constant of one of the fibers relative to that of the other.

The wavelength flattened couplers described by Mortimore were fabricated by pretapering one of the fibers. Since the fiber was tapered, it had to be twisted around the second fiber to insure contact prior to fusing the two fibers together. Not only does the twisting procedure tend to result in greater loss and increased sensitivity of the coupling ratio to the polarization of the light, but it also makes it quite difficult to obtain consistent results. The inventors' experience has shown that it is very difficult to control the coupling length and the mismatch in the propagation constants in the coupling region when one fiber is pre-tapered. This is because the change in the propagation constant along the fiber taper is continuously varying in much the same way as the fiber diameter varies.

Therefore it is an object of the present invention to provide a method of making a single-mode evanescent-wave coupler having reduced wavelength dependence using two initially identical optical fibers.

It is another object of the present invention to provide a method of making a single-mode evanescent-wave coupler which is reliable and reproducible.

It is yet another object of the present invention to provide a method in which it is easy to control the coupling length and the mismatch in the propagation constants in the coupling region.

Additional objects, advantages and novel features of the invention will be set forth in part in the description which follows and in part will become apparent to those skilled in the art upon examination of the following or may be learned by practice of the invention.

SUMMARY OF THE INVENTION

In general, the propagation constant of a single-mode fiber is a complex function of the optical properties of the fiber, the fiber core diameter and wavelength. The optical properties of the fiber are for the most part determined at the time of manufacture and are not easily altered without damaging the fiber. Applicants have determined that the best way to change the propagation constant of the fiber without degrading its performance is to change the diameter of the core.

To achieve the foregoing and other objects and in accordance with the purposes of the present invention, a method of making a single-mode evanescent-wave coupler having reduced wavelength dependence may comprise the steps of: (a) providing first and second single-mode optical fibers having substantially identical propagation constants; (b) heating the first optical fiber along a first longitudinal segment thereof while stretching the first optical fiber to reduce the diameter of the first longitudinal segment, the reduced diameter being substantially uniform along the first longitudinal segment; (c) maintaining the first and second optical fibers in parallel juxtaposition with one another along a portion of the first longitudinal segment; and (d) fusing together the portions of the first and second optical fibers maintained in parallel juxtaposition to form a coupling region.

BRIEF DESCRIPTION OF THE DRAWINGS

The foregoing invention is illustrated in the accompanying drawings wherein:

FIG. 3 is a graph of wavelength response of a single-mode evanescent-wave coupler fabricated according to the present invention.

FIG. 5 is a schematic of the fusion step according to the present invention.

DETAILED DESCRIPTION OF THE PREFERRED EMBODIMENT

A single-mode, evanescent-wave coupler is fabricated using two single-mode fibers, each fiber having a core and cladding region. In many instances the cladding region consists of two concentric cladding layers having different indices of refraction. The inner cladding layer has an index of refraction lower than that of the core of the fiber. The outer cladding, sometimes called the substrate, has an index of refraction greater than the inner cladding layer but not necessarily equal to the index of refraction of the core. This type of fiber is commonly called "depressed cladding" fiber by those skilled in the art. It should be noted that other types of fibers do not have an outer cladding layer or substrate having a relatively high index of refraction. These fibers are called "matched cladding" fibers.

Figure 1:
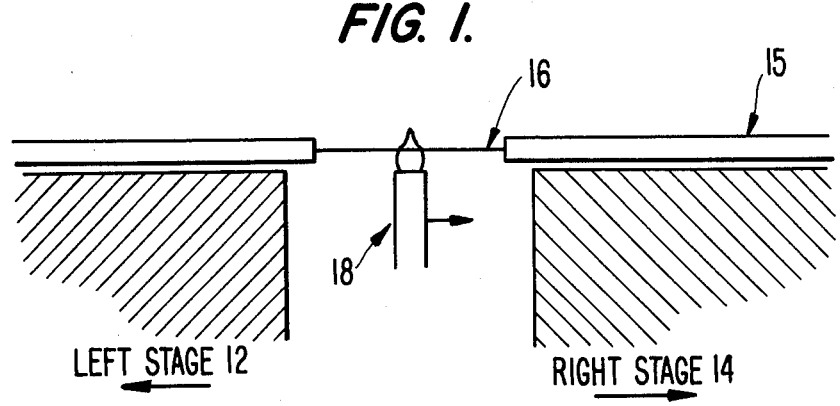
FIG. 1 is a schematic of an apparatus used to uniformly stretch an optical fiber.
Figure 2A:
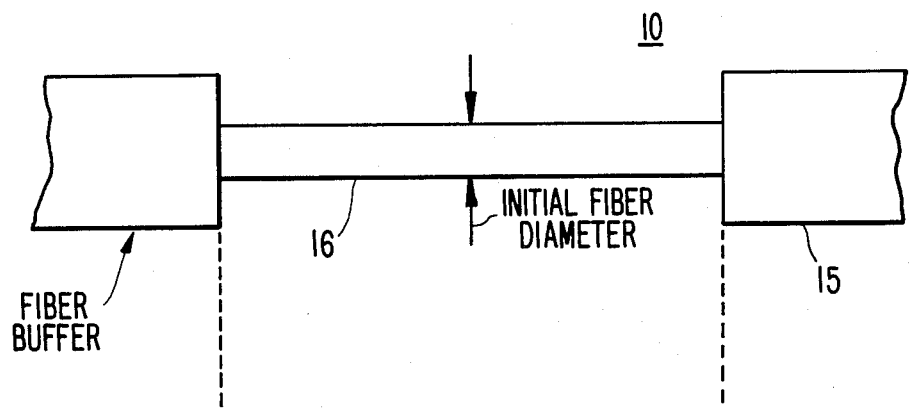
FIG. 2 is a side profile of an optical fiber before stretching.
FIG. 2b is a side profile of an optical fiber after stretching and heating.
Figure 2B:
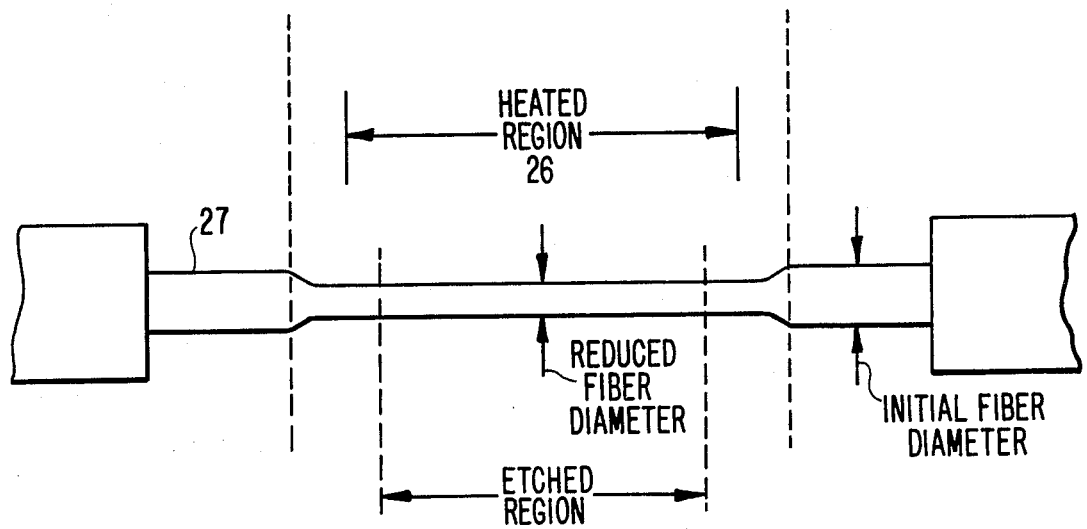

In the present invention a three to four centimeter section of the protective buffer layer on each of two lengths of identical fiber is removed by mechanical or chemical means. The exposed section of each fiber is then chemically cleaned and rinsed. The resultant fiber 10 is shown in FIG. 2a having buffered region 15 and exposed region 16. A difference in the propagation constant between the two fibers is then introduced by reducing the core and cladding diameters of one of the fibers. As shown in FIGS. 1 and 2A this is achieved by mounting one of the fibers 10 onto moveable stages 12, 14 and heating the exposed section of fiber 16 with a moving flame 18. While the flame scans along the fiber, the two stages are slowly moved in opposite directions in order to stretch the fiber and reduce its diameter. A typical profile of a fiber stretched and heated in this manner is shown in FIG. 2b. The heated section 26 of fiber has a constant yet reduced diameter over a substantial length that gradually tapers up to the original fiber diameter at each end 27 of the heated region. The final fiber diameter in the heated region is controlled by the amount the fiber is stretched. It is important to note that a uniform relative motion between the fiber and the flame is required to obtain a constant fiber diameter along the heated section of the fiber.

After the fiber has been stretched to the desired diameter, the second fiber is positioned along side the stretched fiber in the moveable fixtures. The two dissimilar fibers are then chemically etched. The object of the etching procedure is to remove the outer cladding layer or substrate of each fiber and expose the inner cladding layer along a sufficient length of each of the fibers so as to provide an appropriate index profile. An appropriate index profile is one in which the exposed cladding of each fiber has a lower index of refraction than the core of each fiber. Although a variety of etching techniques may be used, it is desirable to etch the subject fibers by a heated etching technique. Referring to FIG. 5, the etched fibers are subsequently maintained in linear parallel juxtaposition and then fused in order to form a coupling region. Details of these steps are described in U.S. Pat. No. 4,632,513 based on U.S. patent application Ser. No. 705,044 filed Feb. 25, 1985 entitled "Polarization Insensitive Evanescent-Wave Fused Coupler with Minimal Environmental Sensitivity". This application is incorporated herein by reference.

A single-mode, evanescent-wave coupler was fabricated using standard, communication grade fiber designed for single mode operation in the 1,300 nanometer to 1,600 nanometer wavelength range. The outside diameter of the fiber was 125 microns. One of the two fibers was heated and stretched in a moving flame to achieve a constant yet reduced outer diameter over a segment of the fiber. During this procedure the stages were slowly moved in opposing directions over a distance of approximately 1.7 mm. The speed of the torch was adjusted such that the flame moved from one end of the exposed fiber section to the other in the same time period the stages moved the desired distance. The two dissimilar fibers were then chemically etched for a predetermined period of time to achieve an appropriate index of refraction profile. For the fibers used in these experiments the optimum diameter of the unstretched fiber after etching was approximately 50 microns. The two fibers were then maintained in linear parallel juxtaposition and fused together to form a suitable coupling region.

Figure 4:
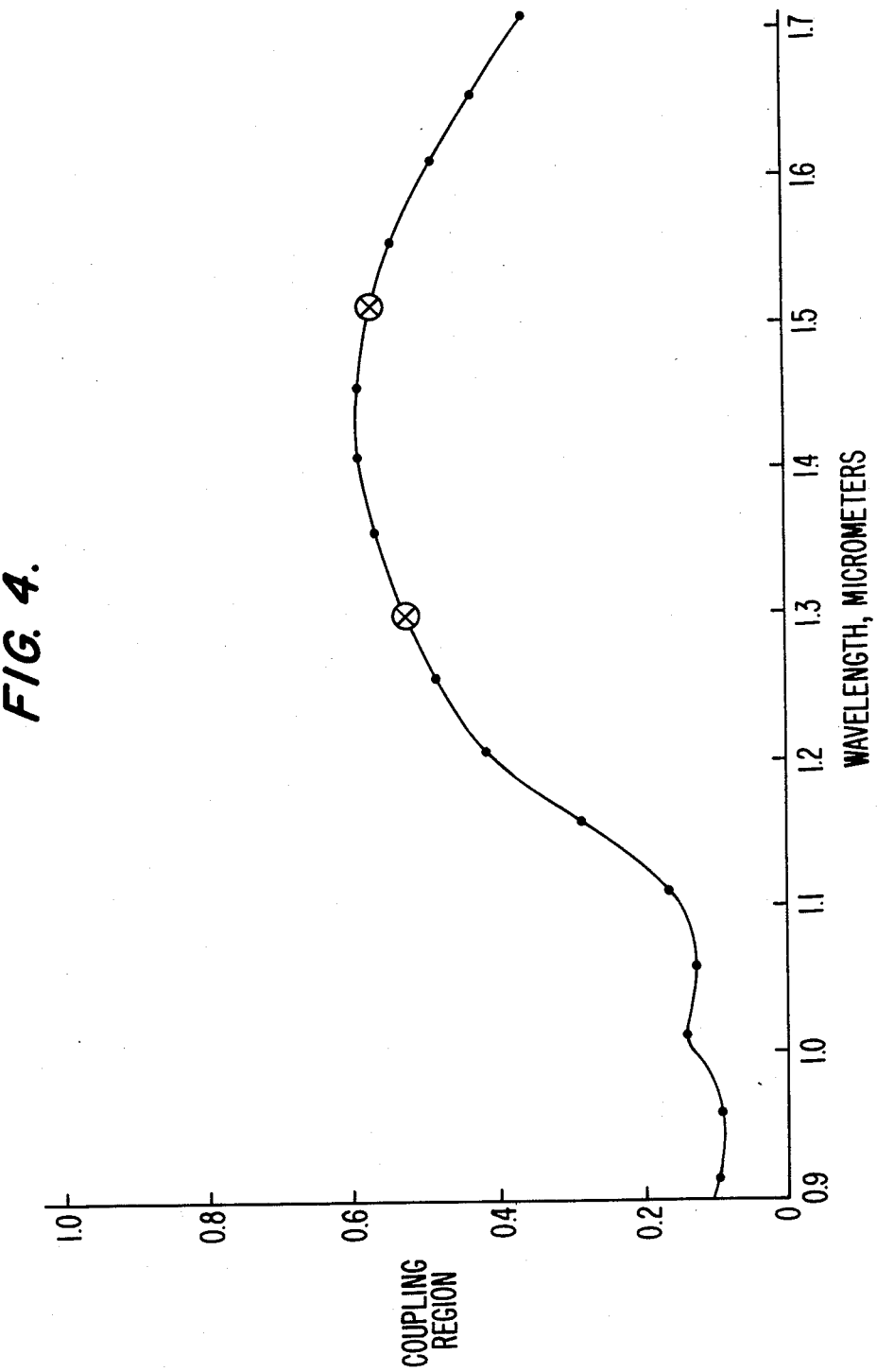
FIG. 4 is a graph of the wavelength response of another single-mode evanescent-wave coupler fabricated according the present invention.

The wavelength response of two reduced wavelength dependent, evanescent-wave couplers constructed in accordance with the foregoing procedures are shown in FIGS. 3 and 4. In both curves, the coupling ratio never exceeds 60% throughout the entire wavelength region tested. This behavior is a direct manifestation of the mismatch in the propagation constants of the two fibers. Furthermore, the coupling ratios remain between 48% and 58% throughout the entire wavelength range of 1,250 nanometers to 1,600 nanometers. As evidenced by the wavelength response curves, the parameters of the fabrication process (diameter reduction, etch time, flame temperature and coupling length) have been optimized such that the maximum coupling ratio or the turning point of the curves occurs near 1,400 nanometers.

An alternative method of fabricating the single-mode evanescent-wave coupler involves etching the two fibers first. One of the two etched fibers is then heated and stretched in a moving flame or heat source to get a constant yet reduced outer diameter over a segment of the fiber. During the heating and stretching procedure, both stages move apart as usual and the torch scans along one fiber.

It should be noted that different heat sources could be used such as open flames or small furnaces. As noted above, two fibers can be etched prior to stretching the one fiber without significantly altering the properties of the resultant coupler. It is clear that it is possible to obtain the desired fiber profile shown in FIG. 2b by using different methods to provide a uniform relative velocity between the heat source and the fiber. For example, the flame or heat source could be kept stationary while the fiber moves through the flame. It is also clear that by altering some of the fabrication parameters it is possible to construct couplers that exhibit reduced wavelength dependence and coupling ratios other than 50% which has been chosen here for example only.

It should be noted that the foregoing methods may be used to reduce the diameters of the core and cladding regions of both fibers comprising the evanescent-wave coupler. If the diameters of the two fibers are reduced by different amounts, a difference in the propagation constants between the fibers can still be achieved and used to reduce the wavelength dependence of the optical coupling.

The foregoing method uniformly and reliably reduces the fiber core diameter and hence alters the propagation constant of the fiber over a chosen length of the fiber. Consequently, two fibers can be reliably held in contact without twisting during the fusing process and the coupling length of the coupler can be better controlled. The properties of the couplers fabricated with this method are more consistent and reproducible than those couplers constructed using the taper and twist method described by Mortimore.

We claim:

1. A method of making a single-mode evanescent-wave coupler having reduced wavelength dependence comprising the steps of:
   (a) providing first and second single-mode optical fibers having substantially identical propagation constants;
   (b) heating the first optical fiber along a first longitudinal segment thereof while stretching the first optical fiber to reduce the diameter of the first longitudinal segment, the reduced diameter being substantially uniform along the first longitudinal segment and different from the diameter of the second single-mode optical fiber;
   (c) maintaining the first and second optical fibers in parallel juxtaposition with one another along a portion of the first longitudinal segment; and
   (d) fusing together the portions of the first and second optical fibers maintained in parallel juxtaposition to form a coupling region.

2. The method of claim 1, wherein said step (b) comprises the substeps of:
   (b1) mounting the first optical fiber on movable stages;
   (b2) moving a heat source along the first longitudinal segment; and
   (b3) moving the movable stages to stretch the first optical fiber while the heat source moves along the first longitudinal segment.

3. The method of claim 2, wherein the heat source is moved along the first longitudinal segment at a substantially uniform velocity relative to the fiber.

4. The method of claim 3, further comprising the step of:
   (c1) prior to said step (c), etching the first longitudinal segment and etching a second longitudinal segment of the second optical fiber, and
   wherein in said step (c), the first and second optical fibers are maintained in parallel juxtaposition with one another along portions of the first and second longitudinal segments.

5. The method of claim 1, further comprising the step of:
   (b1) prior to step (c), heating the second optical fiber along a second longitudinal segment thereof while stretching the second optical fiber to reduce the diameter of the second longitudinal segment, the reduced diameter being substantially uniform along the second longitudinal segment,
   wherein the reduced diameter of the second longitudinal segment is substantially different from the reduced diameter of the first longitudinal segment; and
   wherein in said step (c), the first and second optical fibers are maintained in parallel juxtaposition with one another along portions of the first and second longitudinal segments.

6. A method of making a single-mode evanescent-wave coupler comprising the steps of:
   (a) providing first and second single-mode optical fibers, the first and second optical fibers each having a core surrounded by a cladding and the first and second optical fibers having substantially identical propagation constants;
   (b) etching first and second longitudinal segments of the first and second optical fibers to reduce the thickness of the cladding of the first and second optical fibers;
   (c) heating the first optical fiber along the first longitudinal segment while stretching the first optical fiber to reduce the diameter of the first longitudinal segment, the reduced diameter being substantially uniform along the first longitudinal segment and different from the diameter of the second longitudinal segment;
   (d) maintianing the first and second optical fibers in parallel juxtaposition with one another along a portion of the first and second longitudinal segments; and
   (e) fusing together the portions of the first and second optical fibers maintained in parallel juxtaposition to form a coupling region.

7. The method of claim 6, wherein said step (c) comprises the substeps of:
   (c1) mounting the first optical fiber on movable stages;
   (c2) moving a heat source along the first longitudinal and segment;
   (c3) moving the movable stages to stretch the first optical fiber while the heat source moves along the first longitudinal segment.

8. The method of claim 7, wherein the heat source is moved along the first longitudinal segment at a substantially uniform velocity relative to the fiber.

9. The method of claim 6, further comprising the step of:
   (c1) prior to said step (d), heating the second optical fiber along the second longitudinal segment while stretching the second optical fiber to reduce the diameter of the second longitudinal segment, the reduced diameter being substantially uniform along the second longitudinal segment, and
   wherein the reduced diameter of the second longitudinal segment is substantially different from the reduced diameter of the first longitudinal segment.

10. A method of making a single-mode evanescent-wave coupler having reduced wavelength dependence from first and second single-mode optical fibers having substantially identical propagation constants, comprising the steps of:
   (a) reducing the diameter of a first longitudinal segment of the first single-mode optical fiber, the reduced diameter being substantially uniform along the first longitudinal segment and being different from the diameter of the second single-mode optical fiber; and (b) fusing the second single-mode optical fiber to the first single-mode optical fiber along a portion of the first longitudinal segment, the portions of the first and second single-mode optical fibers which are fused together being in parallel juxtaposition and forming a coupling region.

11. The method of claim 10, wherein said step (a) comprises heating the first single-mode optical fiber along the first longitudinal segment while stretching the first single-mode optical fiber to reduce the diameter of the first longitudinal segment.

12. The method of claim 11, further comprising the step of etching the first and second single-mode optical fibers prior to said step (b).

13. The method of claim 12, wherein said etching step is performed prior to said step (a).

14. The method of claim 12, wherein said step (a) comprises the substeps of:
   (a1) mounting the first single-mode optical fiber on movable stages;
   (a2) moving a heat source along the first longitudinal segment; and
   (a3) moving the movable stages to stretch the first single-mode optical fiber while the heat source moves along the first longitudinal segment.

15. The method of claim 14, wherein the heat source is moved along the first longitudinal segment at a substantially uniform velocity relative to the fiber.

16. The method of claim 14, further comprising the step of heating the second single-mode optical fiber along a second longitudinal segment thereof while stretching the second optical fiber to reduce the diameter of the second longitudinal segment, wherein the reduced diameter of the second longitudinal segment is substantially uniform along the second longitudinal segment, and wherein the reduced diameter of the second longitudinal segment is substantially different from the reduced diameter of the first longitudinal segment.

17. The method of claim 16, wherein said step (b) comprises the substeps of:
   (b1) maintaining the first and second optical fibers in parallel juxtaposition with one another along a portion of the first and second longitudinal segments; and
   (b2) fusing together the portions of the first and second single-mode optical fibers maintained in parallel juxtaposition to form a coupling region.

18. The method of claim 12, wherein said step (b) comprises the substeps of:
   (b1) maintaining the first and second optical fibers in parallel juxtaposition with one another along a portion of the first and second longitudinal segments; and
   (b2) fusing together the portions of the first and second single-mode optical fibers maintained in parallel juxtaposition to form a coupling region.

* * * * *